(12) United States Patent
Hosseiny et al.

(10) Patent No.: US 11,609,563 B2
(45) Date of Patent: Mar. 21, 2023

(54) REMOTE CONTROL SYSTEM FOR A VEHICLE AND TRAILER

(71) Applicant: Ford Global Technologies, LLC, Dearborn, MI (US)

(72) Inventors: Seyed Armin Raeis Hosseiny, Canton, MI (US); Erick Michael Lavoie, Van Buren Charter Township, MI (US); Bo Bao, Bloomfield, MI (US); Siyuan Ma, Detroit, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

(21) Appl. No.: 17/008,622

(22) Filed: Aug. 31, 2020

(65) Prior Publication Data

US 2022/0066442 A1 Mar. 3, 2022

(51) Int. Cl.
| | |
|---|---|
| *G05D 1/00* | (2006.01) |
| *B62D 1/28* | (2006.01) |
| *H04W 4/02* | (2018.01) |
| *B62D 13/06* | (2006.01) |

(52) U.S. Cl.
CPC ............ *G05D 1/0016* (2013.01); *B62D 1/283* (2013.01); *B62D 13/06* (2013.01); *H04W 4/026* (2013.01); *H04W 4/027* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 9,886,795 B2* | 2/2018 | Fialho | G06T 19/006 |
| 9,908,558 B2 | 3/2018 | Popken et al. | |
| 9,916,673 B2* | 3/2018 | Castro | G06T 17/05 |
| 10,081,387 B2 | 9/2018 | El Aile | |
| 10,146,307 B2* | 12/2018 | Yu | G06F 3/012 |
| 10,279,839 B2 | 5/2019 | Lavoie et al. | |
| 2007/0244635 A1* | 10/2007 | Asahara | G01C 21/3453 701/416 |

(Continued)

FOREIGN PATENT DOCUMENTS

| | | |
|---|---|---|
| DE | 102016118967 A1 * | 4/2018 |
| DE | 102016224528 A1 | 6/2018 |

OTHER PUBLICATIONS

Machine Translation of DE-102016118967 (Year: 2018).*

(Continued)

*Primary Examiner* — Maceeh Anwari
(74) *Attorney, Agent, or Firm* — Frank Lollo; Eversheds Sutherland (US) LLP

(57) ABSTRACT

The disclosure describes systems and methods including a mobile device for remotely controlling the movement of a vehicle and trailer. The mobile device provides an intuitive interface for controlling the movement of the vehicle and trailer by changing the orientation of a vehicle graphic (e.g., of the vehicle and trailer) according to a position of the mobile device around a periphery of the vehicle and trailer. This allows the user to walk around the vehicle and trailer to determine a best position from which to control the vehicle and trailer depending on a given situation without losing the intuitiveness of the user interface.

18 Claims, 14 Drawing Sheets

(56) References Cited

U.S. PATENT DOCUMENTS

| | | | |
|---|---|---|---|
| 2012/0284620 A1* | 11/2012 | Yach | G06F 3/04817 |
| | | | 345/651 |
| 2017/0008563 A1* | 1/2017 | Popken | B62D 13/06 |
| 2019/0113351 A1* | 4/2019 | Antony | G01C 21/3461 |
| 2019/0205024 A1 | 7/2019 | Lavoie | |
| 2020/0247471 A1* | 8/2020 | Grodde | G06V 20/58 |

OTHER PUBLICATIONS

"Quantow Gear: World's Smallest Smartphone Controlled Car," Web page <https://www.kickstarter.com/projects/quantow/quantow-smartphone-controlled-minicar.html>, 28 pages, retrieved from the internet on Dec. 1, 2020.

\* cited by examiner

REMOTE CONTROL SYSTEM FOR A VEHICLE AND TRAILER

BACKGROUND

Operating a vehicle with a trailer in tow is very challenging for many drivers. This is particularly true for drivers that are unskilled at backing up vehicles with attached trailers. Such drivers may include those that drive with a trailer on an infrequent basis (e.g., drivers that rent a trailer). For example, when manually reversing a trailer, the direction of the steering wheel input may be counterintuitive to the resulting trailer direction.

Moreover, in remote control situations, a steering wheel angle that should be used to achieve a certain path shape may be difficult to keep straight as a perspective changes at different positions around the vehicle and trailer. A control input that is used to move the trailer one way (e.g., back and to the left) may be intuitive to the user when the user is standing behind the vehicle but counter intuitive when the user is standing in front of the vehicle.

It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
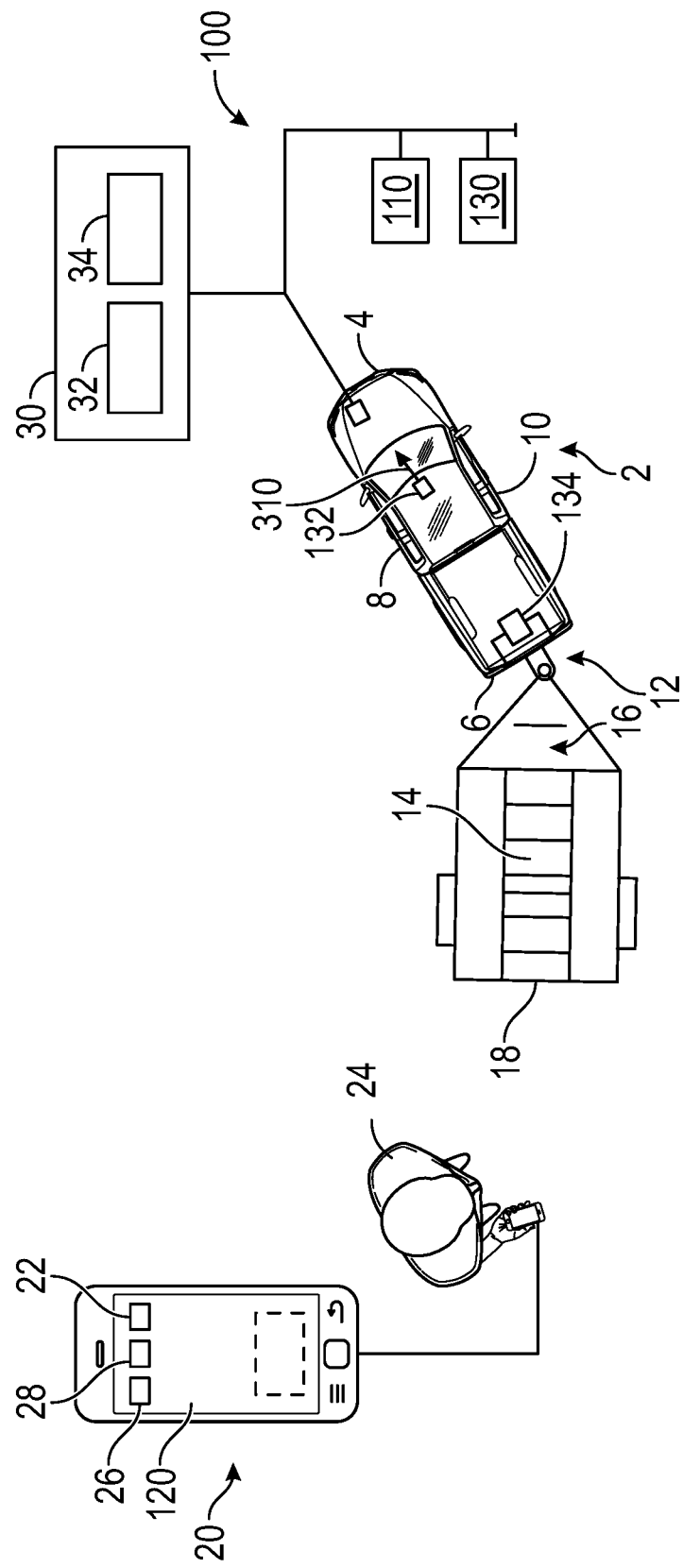
FIG. 1 depicts a vehicle, a trailer, and a mobile device of a vehicle control system for controlling the vehicle in accordance with the present disclosure.

The systems and methods disclosed herein are configured to provide a mobile device for remotely controlling the movement of a vehicle and trailer. The mobile device provides an intuitive interface for controlling the movement of the vehicle and trailer by changing the orientation and perspective of a vehicle graphic (e.g., of the vehicle and trailer) and a path graphic according to a position of the mobile device around a periphery of the vehicle and trailer and tilt of the mobile device. For example, if the mobile device is horizontal the view is a plan view or top view, and if the mobile device is vertical the view is a perspective or elevational view.

Adjusting the orientation of the vehicle graphic allows the user to walk around the vehicle and trailer to determine a best position from which to control the vehicle and trailer depending on a given situation without losing the intuitiveness of the user interface. For example, the user can change position to check for clearance of obstacles in a path before or during control of the vehicle and trailer.

A forward path graphic is positioned at a front end of the vehicle graphic and displays a path extending in a forward direction from the vehicle graphic. A reverse path graphic is positioned at a rear end of the vehicle graphic and displays a path extending in a reverse direction from the vehicle graphic. The path graphics and the forward and reverse directions are aligned with a longitudinal axis of the vehicle graphic.

The shape of the path represents the steering wheel angle of the vehicle as a function of distance or location along a path. The shape of the path can be changed by the user, for example, by a path input.

Forward and reverse control inputs are arranged with respect to the orientation of the vehicle graphic. The forward control input moves the vehicle along the forward path and the reverse control input moves the vehicle along the reverse path.

As the vehicle moves and/or the mobile device moves with respect to the vehicle, the orientation of the vehicle graphic on the mobile device changes to reflect the movement of the vehicle. The forward and reverse control inputs may change to maintain alignment with the orientation of the vehicle graphic so that the direction of the control input is intuitive. In particular, the forward control input is aligned with the forward path of the vehicle graphic and the reverse control input is aligned with the reverse path of the vehicle graphic.

In one example, each of a longitudinal axis of the vehicle graphic and a longitudinal axis of forward and reverse control inputs may be oriented to align with an edge of the display of the mobile device. The edge may be selected as that which most closely aligns with a direction of the vehicle graphic.

Arranging the orientation of the vehicle graphic, path graphic, and control inputs in this way makes it clear how the vehicle and trailer move along each path and which control input to use to move the vehicle and trailer along each path. The user does not have to remember which path or control input corresponds to forward and which to reverse. Rather, for example, a path that is shown on the user interface as moving the vehicle and trailer to the left from the perspective of the user has a corresponding control input pointing in the left direction for initiating the movement along that path.

The use of a path and a directional control removes the need to know the correct steering wheel input to achieve a path. Accordingly, the user interface simplifies the control of the vehicle and trailer to intuitive selection of a shape of a path in a forward or reverse direction (e.g., because of the orientation of the vehicle graphic) and using the corresponding control input to initiate movement along that path.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 illustrates a vehicle 2. The vehicle 2 includes a front end 4, a back end 6, a left side 8 (e.g., a driver side), and a right side 10 (e.g., a passenger side). The vehicle 2 includes a hitch 12. The hitch 12 (also referred to as a tow hitch, a tow bar, a trailer hitch, etc.) is located at the back end 6 of the vehicle 2. For example, the hitch 12 is coupled to and extends from a chassis of the vehicle 2.

Although illustrated as a truck, the vehicle 2 may take the form of another passenger or commercial automobile such as, for example, a car, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 2 may be configured as an electric vehicle (EV). More particularly, the vehicle 2 may include a battery EV (BEV) drive system. The vehicle 2 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 2 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 2 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering.

Level-2 autonomy in vehicles may provide partial automation of steering and acceleration functionality, where the automated system(s) are supervised by a human driver that performs non-automated operations such as braking and other controls.

Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task.

Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure.

Level 5 autonomy is associated with autonomous vehicle systems that require no human input for operation, and generally do not include human operational driving controls.

A trailer 14 includes a front end 16 and a back end 18. Trailers are utilized for various purposes including hauling objects (e.g., other vehicles), moving, and camping.

The trailer 14 is coupled to the vehicle 2 via the hitch 12 such that the vehicle 2 is able to pull or push the trailer 14 from one location to another location. The hitch 12 is configured to receive a trailer connector (as illustrated, located at the front end 16) of the trailer 14 to couple the trailer 14 to the vehicle 2.

The hitch 12 allows the trailer 14 to rotate. The trailer 14 follows the path of the vehicle 2 when the vehicle 2 moves forward. The path of the trailer 14 when the vehicle 2 moves in reverse depends on the direction of force (e.g., due to steering angle) applied by the vehicle 2 at the hitch 12. If the longitudinal axes of the vehicle 2 and trailer 14 are aligned through the hitch 12, the reverse path is straight. If the longitudinal axis of the vehicle 2 and the longitudinal axis of the trailer 14 are at an angle, the reverse path is has a curved shape.

The movement of the vehicle 2 and trailer 14 may be remotely controlled by a user 24 using a mobile device 20 according to systems and methods described in further detail below. The mobile device 20 generally includes a memory 26 and a processor 28. The memory 26 stores an application 22 including program instructions that, when executed by the mobile device processor 28, performs aspects of the disclosed embodiments. The application 22 may be part a of a vehicle control system 100 described below or may provide and or receive information from the vehicle control system 100.

The mobile device 20 further includes a user interface 120 and sensors including a compass sensor 410 (see FIG. 6), an accelerometer 510 (see FIG. 7), and a camera (not shown).

The vehicle 2 includes an automotive computer 30. The automotive computer 30 may be or include an electronic vehicle controller. The automotive computer 30 may be installed in an engine compartment of the vehicle 2 as schematically illustrated or elsewhere in the vehicle 2. The automotive computer 30 may operate as part of a vehicle control system 100 described in further detail below.

The automotive computer 30 may include one or more processor(s) 32 and a computer-readable memory 34. The one or more processor(s) 32 may be disposed in communication with one or more memory devices disposed in communication with the respective computing systems (e.g., the memory 34 and/or one or more external databases not shown in FIG. 1). The processor(s) 32 may utilize the memory 34 to store programs in code and/or to store data for performing aspects of methods in accordance with the disclosure.

The memory 34 may be a non-transitory computer-readable memory storing program code. The memory 34 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

Figure 16:
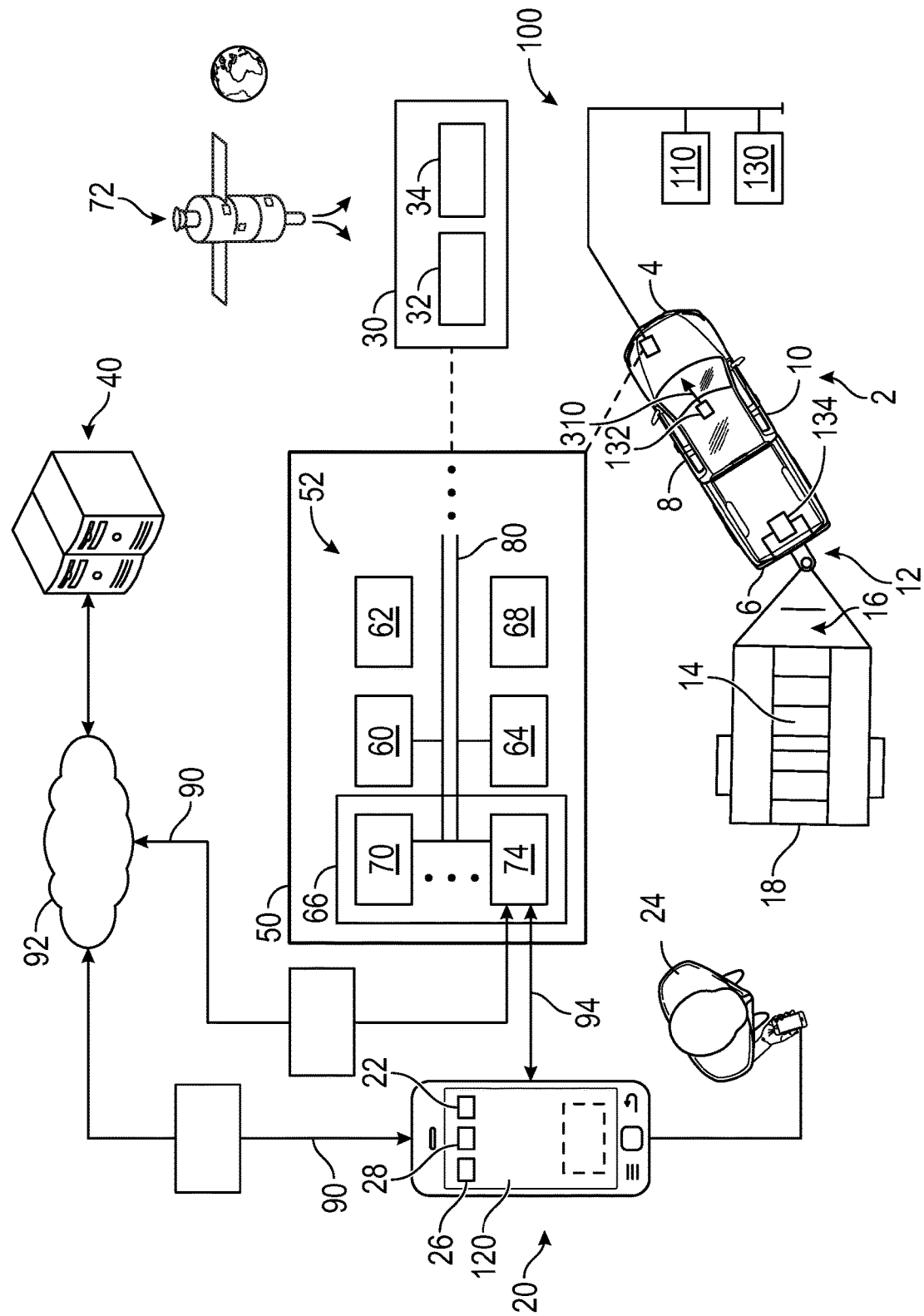
FIG. 16 depicts a vehicle, a trailer, and an example functional schematic of a vehicle control system for controlling the vehicle with a mobile device in accordance with the present disclosure.

The automotive computer 30 may, in some example embodiments, be disposed in communication with the mobile device 20 and one or more server(s) 40 (shown in FIG. 16).

FIG. 1 illustrates an example functional schematic of the vehicle control system 100 of the vehicle 2 including some elements described above. The vehicle control system 100 can include a vehicle system controller 110, the mobile device 20 with the application 22 and a user interface 120 (e.g., a touch-sensitive display screen), and a plurality of sensors 130.

The vehicle system controller 110 may be configured or programmed to control one or more vehicle subsystems. Examples of subsystems that may be controlled by the vehicle system controller 110 may include one or more systems for controlling braking, ignition, steering, acceleration, transmission control, and/or other control mechanisms. Vehicle systems are described in greater detail with respect to FIG. 16. The vehicle system controller 110 may control the subsystems based, at least in part, on signals generated by the sensors 130 and the mobile device 20 (e.g., control signal 170). The mobile device 20 may also provide data transfer functions of the system 100. For example, the mobile device 20 (e.g., a smartphone) connects to the vehicle 2 to obtain sensor data from sensors 130 on behalf of the vehicle control system 100.

The sensors 130 may include autonomous driving sensors, which include any number of devices configured or programmed to generate signals that help navigate the vehicle 2 while the vehicle 2 is operating in the autonomous (e.g., driverless) mode. Examples of autonomous driving sensors include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The sensors 130 further include a direction sensor 132 (e.g., a compass or magnetometer) of the vehicle 2 and an angle sensor 134 that is configured to determine an angle between the vehicle 2 and the trailer 14.

The mobile device 20 may be configured or programmed to present information to the user 24 via the user interface 120 during operation of the vehicle 2. The mobile device 20 may also be configured or programmed to receive inputs from the user 24 via the user interface 120 to operate the vehicle 2. The mobile device 20 can be used to control the vehicle 2 at various locations 430 or positions outside and around the periphery 420 of the vehicle 2.

Figure 2:
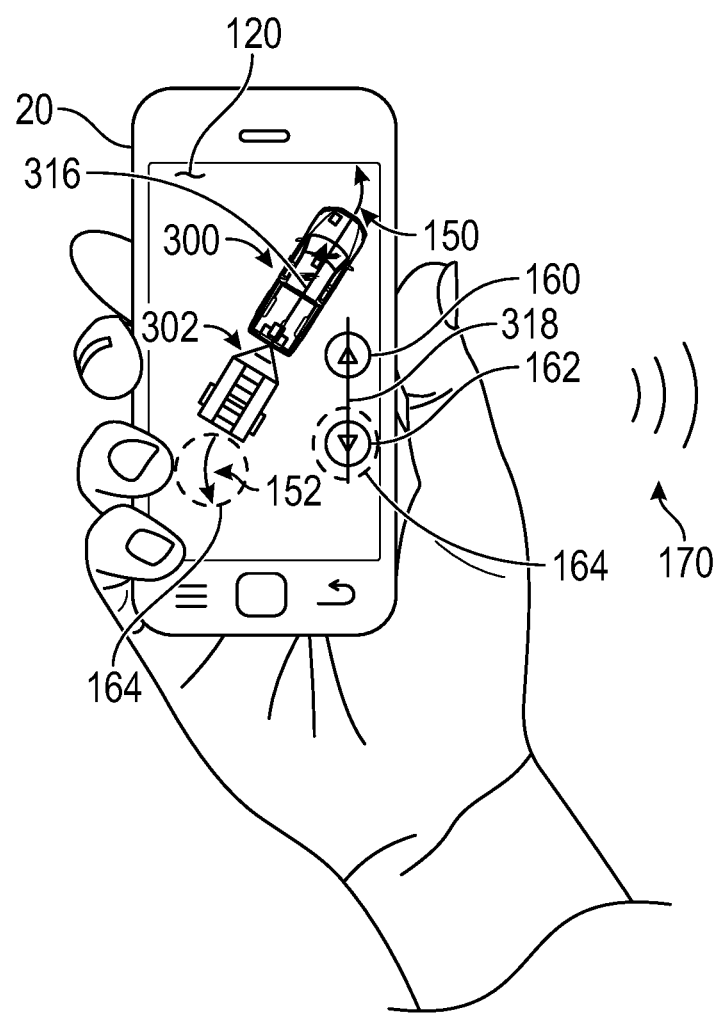
FIG. 2 is a schematic illustration of the mobile device of FIG. 1 with a user interface displaying a graphic of a vehicle and trailer in accordance with the present disclosure.

Referring to FIG. 2, the mobile device 20 displays a vehicle trailer graphic 300, 302 that represents the vehicle 2 and the trailer 14 in a corresponding orientation.

The mobile device 20 also displays a path graphic 150, 152 that extends from the vehicle trailer graphic 300, 302. The path graphic 150, 152 represents a controlled movement of the vehicle 2 and trailer 14 in one of a forward direction (e.g., forward path graphic 150 aligned with a front end of vehicle graphic 300, 302) and a reverse direction (e.g., reverse path graphic 152 aligned with a back end of vehicle graphic 300, 302) from a first location to a second location. For example, the path graphics 150, 152 are aligned with a longitudinal axis 316 of the vehicle graphic 300, 302 (e.g., the directions 310, 312). The path graphics 150, 152 could either be curved or straight lines and each one is a different embodiment of the disclosure.

The mobile device 20 displays control inputs 160, 162. A forward control input 160 controls forward movement along a forward path represented by forward path graphic 150 and reverse control input 162 controls reverse movement along a reverse path represented by reverse path graphic 152.

Although both the forward path graphic 150, the reverse path graphic 152, and forward and reverse control inputs 160, 162 are displayed in FIG. 2, the displayed path graphic and control input may be limited to a single direction. For example, the mobile device 20 may receive a selection of a forward direction or a reverse direction form a user. The mobile device 20 may then highlight (e.g., via a color or thickness) or display only the path graphic and control input for the selected direction. As an example, in FIG. 2, the reverse path graphic 152 and the reverse control input 160 are highlighted (as represented by dashed lines 164) in response to receiving a selection of a reverse direction.

The forward path 150 represents the controlled path of the vehicle 2 and trailer 14 moving in a forward direction (e.g., when using the forward control input 160 of the user interface 120). The forward path 150 may be straight or may be have a curved shape. The curved shape of the forward path 150 is based on the angle of the steering wheel of the vehicle 2 as the vehicle 2 moves forward along the path. The angle of the steering wheel may change at certain locations along the path to achieve a curved shape. As such, a forward path 150 with a curved shape may be associated with various steering wheel angles that are a function of distance or location along the forward path 150 to control the vehicle 2 and trailer 14 along a curved path.

The reverse path 152 represents the controlled path of the vehicle 2 and trailer 14 moving in a reverse direction (e.g., when using a reverse control input 162 of the user interface 120). The reverse path may be straight or may be have a curved shape. The curved shape of the reverse path is based on the angle of the steering wheel of the vehicle 2. The angle of the steering wheel may change at certain locations along the path to achieve a curved shape. As such, a reverse path 152 with a curved shape may be associated with various steering wheel angles that are a function of distance along the reverse path 152 to control the vehicle 2 and trailer 14 along the curved path.

The vehicle system controller 110 may receive control signals 170 from the mobile device 20, and maneuver the vehicle 2 to move the trailer 14 based on a determined maneuver path 150, 152 and direction or input from a control input 160, 162.

Figure 3:
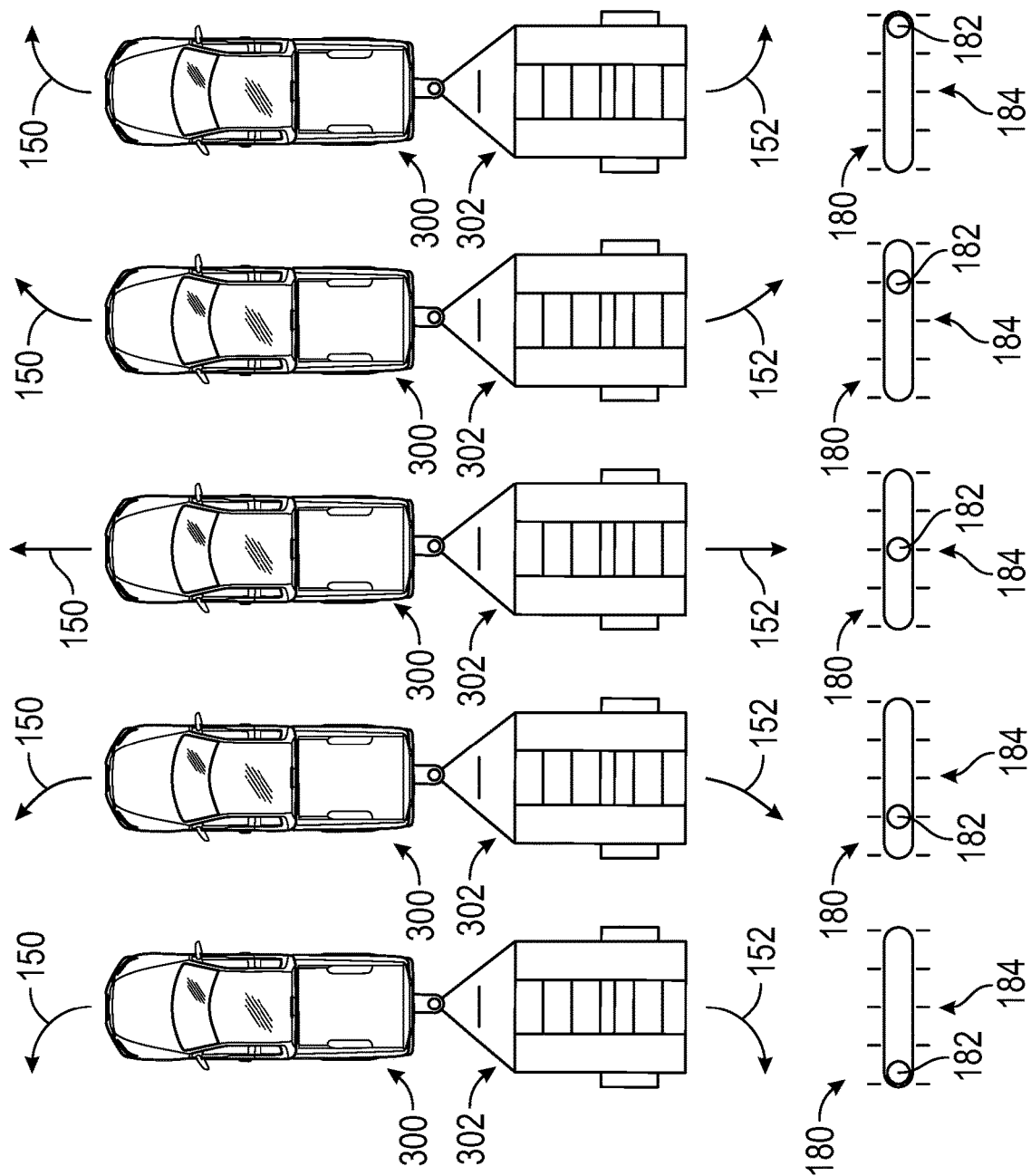
FIG. 3 is a schematic illustration of various settings of a path input of the mobile device of FIG. 2 in accordance with the present disclosure.

Referring to FIG. 3, the shape of the path 150, 152 may be determined and displayed as a function of the position of a path input 180 of the mobile device 20. The path input 180 changes the shape of the path 150, 152. Although both forward and reverse paths 150, 152 are illustrated in FIG. 3, the path input 180 may be used to adjust the shape of one path graphic, for example, after a selection of a direction. As illustrated in FIG. 3, the illustrated paths 150, 152 curve up and to the left and curve down and to the left to varying degrees when a setting 182 of the path input 180 is moved left of a center position 184. The illustrated paths 150, 152 curve up and to the right and curve down and to the right to varying degrees when the setting 182 the path input 180 is moved right of the center position 184. The paths 150, 152 are straight when the setting 182 of the path input 180 is at the center position 184.

The path input 180 is illustrated in FIG. 3 as a slide input but may alternatively be another type of input such as a dial input.

The path input 180 may be used adjust a variable of a curvature function that changes the curvature of the paths 150, 152. The path input 180 may be used to scroll through different possible paths 150, 152 with different shapes that may be achieved with predetermined control instructions for controlling the steering angle based on distance along the path. In the reverse direction, the possible paths may depend on the initial angle between the vehicle 2 and the trailer 14.

The control inputs 160, 162 are aligned on a controls axis 318 and are arranged according to the direction of a controls vector 319. For example, forward control input 160 is positioned in a positive distance and direction (direction of controls vector 319) along the controls axis 318 relative to the reverse control input 162. The controls vector 319 is parallel or at an acute angle 321 (e.g., +/−45 degrees) to the direction 310. Accordingly, the controls axis 318 is parallel or at an acute angle (e.g., +/−45 degrees) to the longitudinal axis 316 of the vehicle graphic 300, 302. The longitudinal axis 316 of the vehicle graphic 300, 302 may alternatively be defined by points on the vehicle graphic 300 and trailer graphic 302.

Figure 4:
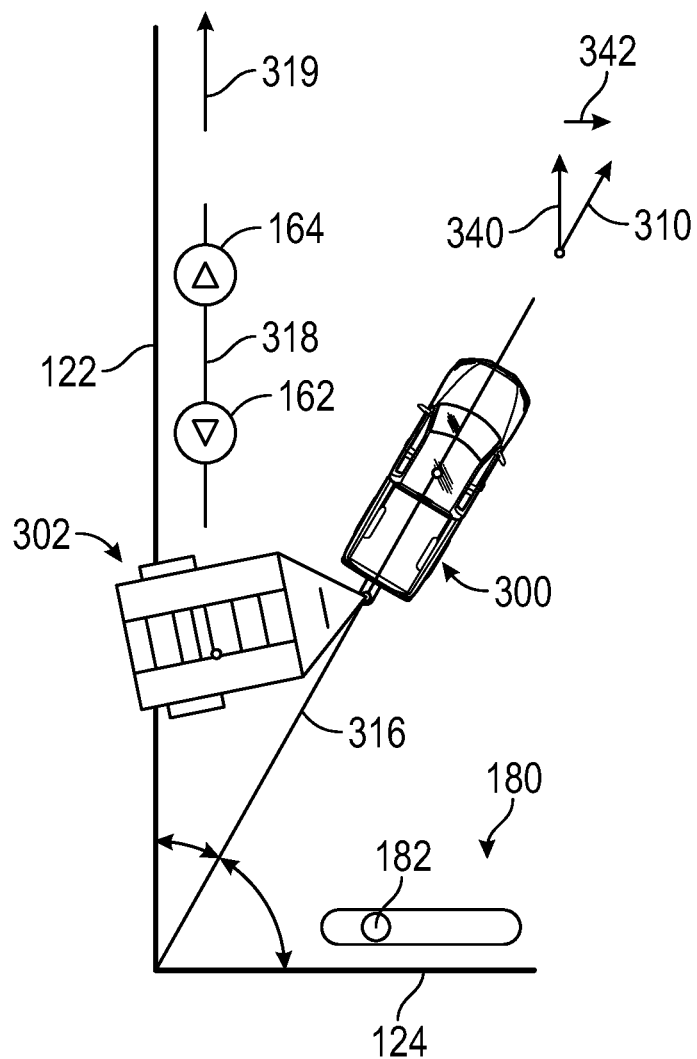
FIG. 4 is a schematic illustration of various orientations of the vehicle trailer graphic on the mobile device of FIG. 2 and various arrangements of control inputs with respect to edges of the mobile device in accordance with the present disclosure.
Figure 4:
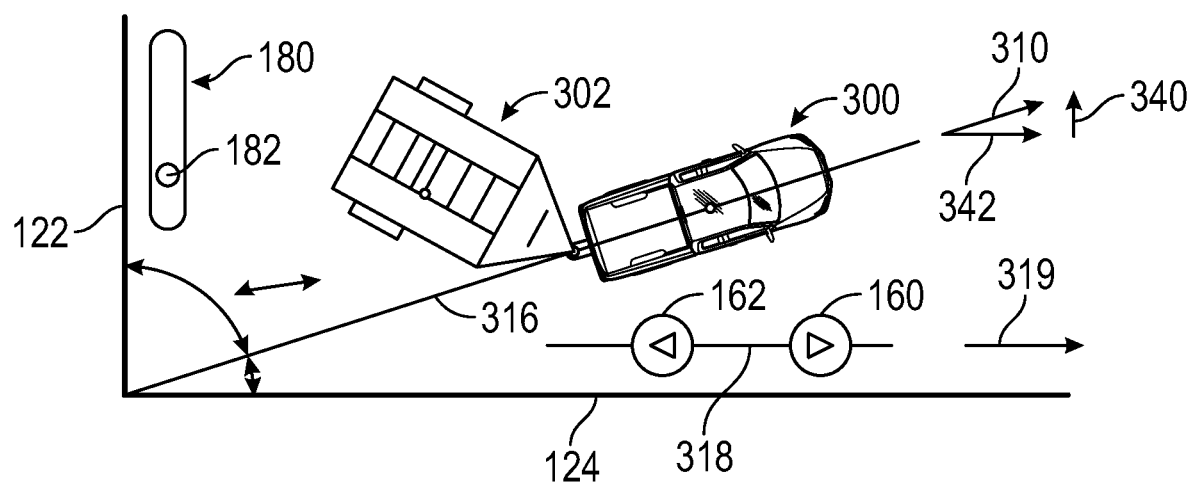

Referring to FIG. 4, the control inputs 160, 162 are aligned or parallel with an edge 122, 124, 126, 128 of the user interface 120 (e.g., display) of the mobile device 20 based on which of two vector components 340, 342 of the direction 310 of the vehicle graphic 300, 302 is greater. For example, the greater of the two vector components 340, 342 defines the direction of the controls vector 319.

The vector component 340 is parallel to the edges 122, 126 and the vector component 342 is parallel to the edges 124, 128. If the vector component 340 is greater than the vector component 342, the control inputs 160, 162 are aligned (e.g., parallel) with the edges 122, 126. If vector component 342 is greater than the vector component 340, the control inputs 160, 162 are aligned (e.g., parallel) with the edges 124, 128. The control inputs 160, 162 may be positioned adjacent one of the edges with which it is aligned or parallel.

As an example, if in the process of controlling the vehicle 2 with the control inputs 160, 162, the orientation of the vehicle graphic 300, 302 changes on the user interface 120 (e.g., because of movement of the vehicle 2, the user 24, or rotation of the mobile device 20) such that the vector component 342 goes from being greater than the vector component 340 to being less than the vector component 340, the control inputs 160, 162 may move from the edge 122 to the edge 124 as illustrated in FIG. 4. The control inputs 160, 162 may "snap" to an edge depending on the orientation of the vehicle graphic 300, 302.

In addition, referring to FIG. 4, the path input 180 is aligned or parallel with an edge 122, 124, 126, 128 of the user interface 120 (e.g., display) of the mobile device 20 based on which of two vector components 340, 342 of the direction 310 of the vehicle graphic 300, 302 is smaller. For example, the smaller of the two vector components 340, 342 defines the direction of the controls vector 319. The alignment of the path input 180 may be at an angle that is 45 to 135 degrees (e.g., perpendicular) to the longitudinal axis 316 or direction of the path graphic 300, 302.

The path input 180 may be aligned with an edge 122, 124, 126, 128 so as to be perpendicular to the alignment of the control inputs 160, 162. The edge 122, 124, 126, 128 can be determined as that which most closely aligns with an axis that is perpendicular to the longitudinal axis 316 of the path graphic 300, 302.

The vector component 340 is parallel to the edges 122, 126 and the vector component 342 is parallel to the edges 124, 128. If the vector component 340 is smaller than the vector component 342, the path input 180 is aligned (e.g., parallel) with the edges 122, 126. If vector component 342 is smaller than the vector component 340, the path input 180 is aligned (e.g., parallel) with the edges 124, 128. The path input 180 may be positioned adjacent one of the edges with which it is aligned or parallel.

As an example, if in the process of controlling the vehicle 2, the orientation of the vehicle graphic 300, 302 changes on the user interface 120 (e.g., because of movement of the vehicle 2, the user 24, or rotation of the mobile device 20) such that the vector component 342 goes from being greater than the vector component 340 to being less than the vector component 340, the path input 180 may move from the edge 124 to the edge 122 as illustrated in FIG. 4. The path input 180 may "snap" to an edge depending on the orientation of the vehicle graphic 300, 302.

Figure 5:
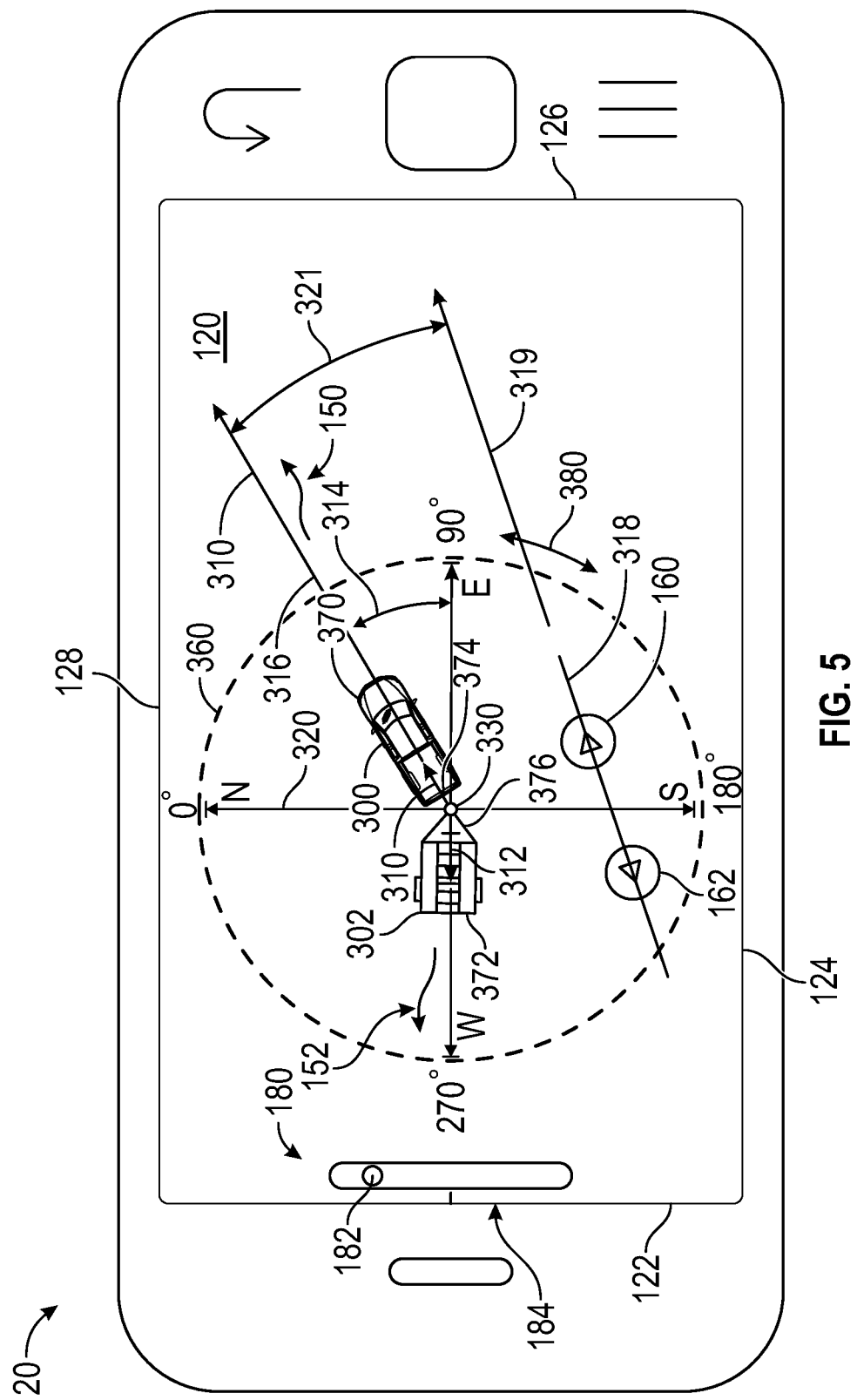
FIG. 5 is a schematic illustration of the mobile device of FIG. 2 illustrating a coordinate system in accordance with the present disclosure.
Figure 6:
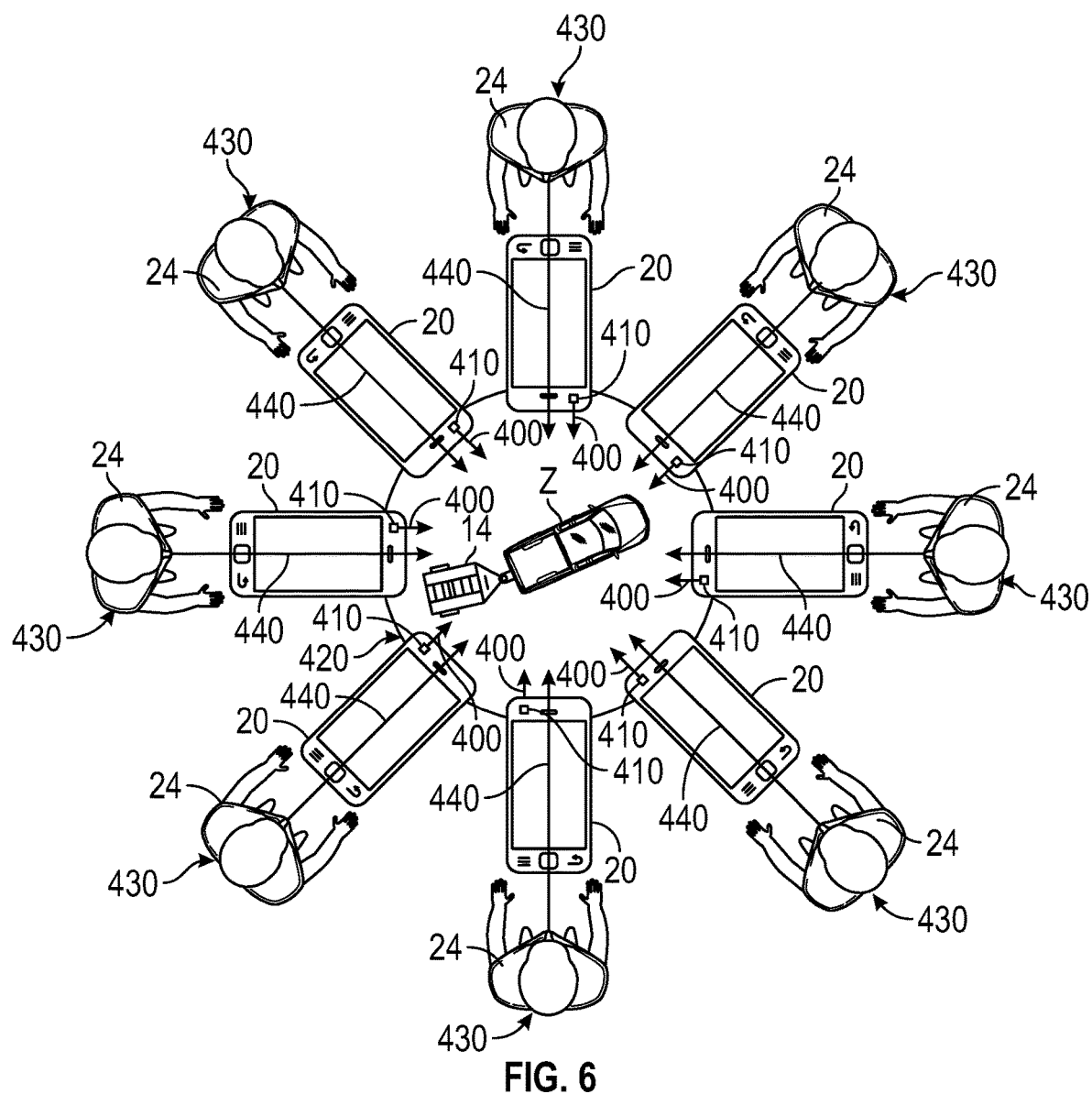
FIG. 6 is a top view of the vehicle and trailer of FIG. 1 illustrating the use of the mobile device by a user at various positions around a periphery of the vehicle and trailer in accordance with the present disclosure.

Referring to FIGS. 5-6, example methods of automatically or semi-automatically generating the vehicle trailer graphic 300, 302 for display on the graphical user interface 120 of the mobile device 20 are now described. An orientation mode may be initiated through the user interface 120.

Referring to FIG. 5, the orientation of the vehicle graphic 300, 302 on the mobile device 20 may be based on measurements of the direction of the vehicle 2 and trailer 14. For example, the orientation of the vehicle graphic 300 and trailer graphic 302 may be determined using directions 310, 312 and a coordinate system. The direction 310 may be determined from the direction sensor 132 (e.g., a compass sensor such as a magnetometer that detects magnetic field strength). The direction 312 may be determined with an angle 314 that is measured relative to direction 310. The angle 314 is measured by the angle sensor 134. The directions 310, 312 orient the graphics 300, 302 on a coordinate system 320 (e.g., as vectors).

Two directions may be used (e.g., one for each of the vehicle 2 and trailer 14) to show the angle between the vehicle 2 and the trailer 14. Alternatively, one direction may be used if the system 100 is used to control the vehicle 2 without the trailer 14 or to approximate the orientation of the vehicle 2 and trailer 14 without showing any angle therebetween.

In FIG. 5, the coordinate system 320 is a polar coordinate system although other coordinate systems are contemplated. A point of connection (e.g., the hitch 12) between the vehicle 2 and the trailer 14 corresponds to a reference point 330 (e.g., origin) of the coordinate system 320.

As illustrated, the axes and degrees of the coordinate system 320 are associated with cardinal directions: north, south, east, and west. A reference direction at 0 degrees is a north direction, 90 degrees is an east direction, 180 degrees is a south direction, and 270 degrees is a west direction. It should be understood that the axes of the example coordinate system can be defined in different ways.

The directions 310, 312 are angles that are measured relative to the reference direction. In FIG. 5, the direction 310 is at 60 degrees and the direction 312 is at 270 degrees.

Conceptually, the direction 310 is a direction pointing from the hitch 12 to the front end 4 of the vehicle 2 and aligns with a length dimension of the vehicle 2 (e.g., symmetrically bisects the vehicle 2). The direction 310 is determined from the direction sensor 132 as an angle from 0 to 360 degrees on the coordinate system 320.

Similarly, the direction 312 is a direction moving from the hitch 12 to the back end 18 of the trailer 14 and aligns with a length dimension of the trailer 14 (e.g., symmetrically bisects the trailer 14). The direction 312 is determined or from the direction 310 and the angle 314 between the longitudinal axis 316 of the vehicle 2 and a longitudinal axis of the trailer 14. For example, the direction 312 is the direction 310 plus the angle 314 plus 180 degrees. Alternatively, the direction 312 can be directly determined from, for example, a trailer compass sensor.

The mobile device 20 receives information (e.g., directions 310, 312) from the vehicle 2 and generates an image 360 for display on the user interface 120. The image 360 displays the vehicle graphic 300 and the trailer graphic 302 on the coordinate system 320. For simplicity, the graphics 300, 302 may be displayed without displaying the coordinate system 320 (e.g., see FIGS. 10-13). However, for purposes of teaching, the coordinate system 320 is illustrated as visible in FIG. 5, for example, to further orient the user 24.

The vehicle graphic 300 and the trailer graphic 302 are displayed on the coordinate system 320 to extend radially outward from the reference point 330 of the coordinate system 320 and have longitudinal axes aligned with respective directions 310, 312. A front end 370 of the vehicle graphic 300 is distal from the reference point 330 and a back end 372 of the trailer graphic 302 is distal from the reference point 330. A back end 374 of the vehicle graphic 300 is proximal to the reference point 330 and a front end 376 of the trailer graphic 302 is proximal to the reference point 330. The reference point 330 represents a connection between the vehicle graphic 300 and the trailer graphic 302.

The scale of the graphics 300, 302 may be based on the dimensions of the vehicle 2 and trailer 14. The dimensions of the vehicle 2 and trailer 14 may be known values stored in memory, may be entered manually or selected, or may be determined from sensors 130 of the vehicle 2 and/or trailer 14.

The vehicle graphic 300 and the trailer graphic 302 may be fixed in the respective directions 310, 312 on the coordinate system 320 unless or until the directions 310, 312 are updated with new information from the vehicle 2 (e.g., movement of the vehicle 2 and trailer 14). The vehicle graphic 300 and the trailer graphic 302 (and the directions 310, 312) rotate with rotation 380 of the coordinate system 320. For example, the image 360 rotates 380 to rotate the coordinate system 320 and graphics 300, 302. For illustration, the coordinate system 320 rotates 380 from the position illustrated in FIG. 5 to the position illustrated in FIG. 9; and rotation 380 of the coordinate system 320 is further illustrated in FIGS. 10-13.

The coordinate system 320 is rotated 380 such that the orientation of the vehicle graphic 300 and the trailer graphic 302 corresponds to the orientation of the vehicle 2 and the trailer 14. As such, the user interface 120 of the mobile device 20 provides an intuitive control for remotely controlling the movement of the vehicle 2 and trailer 14 from any position around a periphery 420 of the vehicle 2 and trailer 14.

Referring to FIG. 6, the orientation of the graphic 300, 302 on the mobile device 20 is further based on a location 430 where the mobile device 20 is used. For example, the coordinate system 320 is rotated 380 based on a device location direction 400 (e.g., compass direction from a device position to the vehicle 2) from a compass sensor 410 of the mobile device 20. The device location direction 400 reflects the position of the mobile device 20 around the periphery 420 of the vehicle 2 and trailer 14. Generally, in use, the user 24 stands at any location 430 around the periphery 420 of the vehicle 2 and the trailer 14. The user 24 faces the vehicle 2 and the trailer 14 in a viewing direction 440 with the mobile device 20 in between the user 24 and the vehicle 2/trailer 14. The mobile device 20 is aligned with the viewing direction 440 so that the user 24 is viewing the user interface 120 with the vehicle 2 and the trailer 14 in the background.

With the mobile device 20 aligned with the viewing direction 440, the device location direction 400 is the same or approximately the same as the viewing direction 440. Both the device location direction 400 and the viewing direction 440 change based on the location 430 of the mobile device 20 around the periphery 420 of the vehicle 2 and the trailer 14.

The device location direction 400 and the viewing direction 440 are generally opposite to a direction from the vehicle 2 and trailer 14 to the location 430 where the mobile device 20 is used to control the vehicle 2 and the trailer 14. For example, if the mobile device 20 is used on the east side of the vehicle 2, the device location direction 400 and the viewing direction 440 are west. If the mobile device 20 is used on the north side of the vehicle 2, the device location direction 400 and the viewing direction 440 are south. Various viewing directions 440 and device location directions 400 are illustrated in FIG. 6.

The orientation of the graphic 300, 302 on the mobile device 20 and/or the type of view that is displayed may also be based on how the mobile device 20 is rotated and/or tilted.

Figure 7:
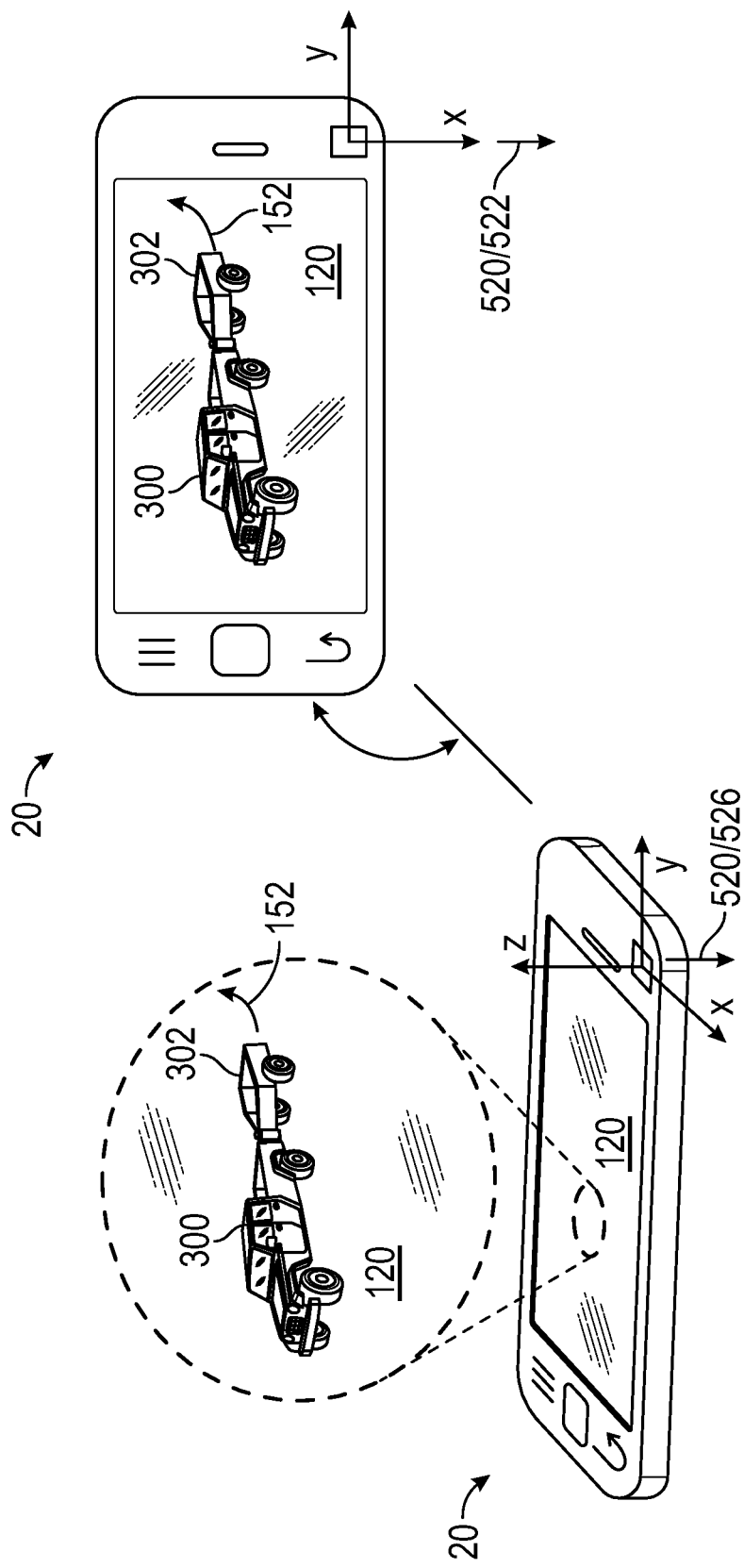
FIG. 7 is a perspective view of the mobile device of FIG. 1 illustrating various degrees of tilt according to the present disclosure.
Figure 8:
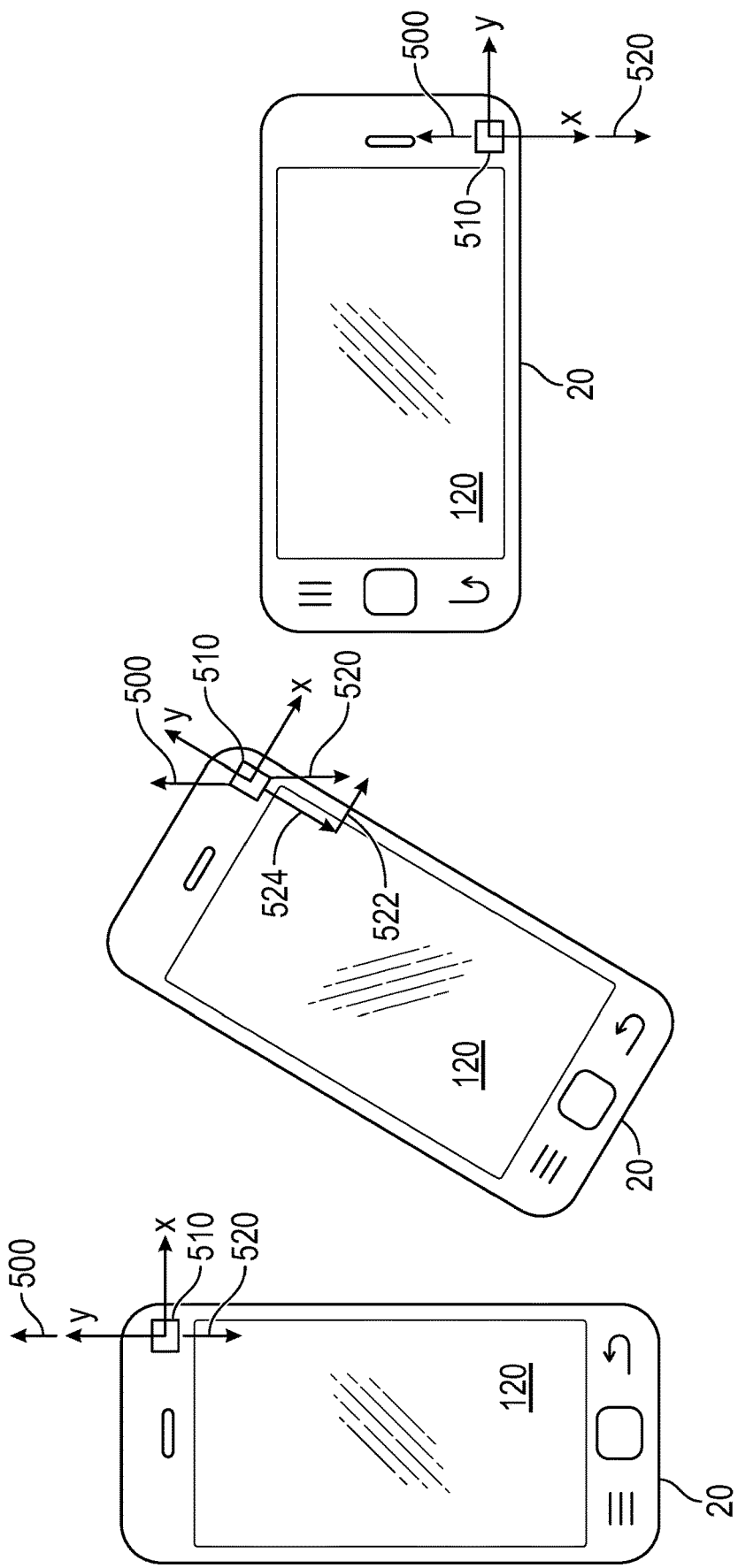
FIG. 8 is a schematic illustration of the mobile device of FIG. 1 illustrating various angles of rotation about an axis that is orthogonal to the user interface according to the present disclosure.

Referring to FIGS. 7 and 8, rotation and tilt of the mobile device 20 are determined, for example, based on measurements of an accelerometer 510 of the mobile device 20. For example, gravitational acceleration (9.8 m/s2) is applied to the accelerometer 510 and represented by an acceleration vector 520 (e.g., a vector with the magnitude of gravitational acceleration in a direction toward the surface of the earth). The accelerometer 510 measures the distribution of the acceleration vector 520 along an x-axis, y-axis, and z-axis (e.g., vectors 522, 524, 526 respectively) of the mobile device 20.

Tilt of the mobile device 20 (e.g., whether the mobile device 20 is held vertically or horizontally) may be based on a magnitude of the vector 526. Referring to FIG. 7, the mobile device 20 is illustrated as being tilted from a horizontal landscape orientation to a vertical landscape orientation.

In FIG. 7, in the horizontal landscape orientation, the acceleration vector 520 is orthogonal to the x-y plane (e.g., aligned with the z-axis in the negative direction). For example, the vector 526 is substantially the same as the acceleration vector 520.

In the vertical landscape orientation, the acceleration vector 520 is in the x-y-plane (e.g., aligned with the x-axis in the positive direction). For example, the vector 522 is substantially the same as the acceleration vector 520. In a vertical portrait orientation, the acceleration vector 520 is also in the x-y-plane (e.g., aligned with the y-axis in the negative direction). For example, the vector 524 is substantially the same as the acceleration vector 520.

Accordingly, the tilt of the mobile device 20 can be determined based on the magnitude of the z-axis vector 526. For example, if the z-axis vector 526 is small, the mobile device 20 is vertical; and if the z-axis vector 526 is approximately the same as the acceleration vector 520, the mobile device 20 is horizontal. For magnitudes of the z-axis vector 526 between zero and the acceleration vector 520, the tilt is between vertical and horizontal.

Rotation of the mobile device 20 (e.g., about the z-axis) may be determined based on vectors 522, 524. Referring to FIG. 8, the mobile device 20 is illustrated as being rotated from a vertical portrait orientation to a vertical landscape orientation. In the vertical portrait orientation, the acceleration vector 520 is in the negative direction on the y-axis. Here, a device rotation direction 500, opposite the acceleration vector 520, is in the positive direction on the y-axis. For example, the vector 524 is substantially the same as the acceleration vector 520.

Holding the mobile device 20 in a vertical landscape orientation, the acceleration vector 520 is in the positive direction on the x-axis. For example, the vector 522 is substantially the same as the acceleration vector 520. Here, the device rotation direction 500 is in the negative direction on the x-axis.

In another illustrated vertical orientation, the acceleration vector 520 (e.g., the sum of vector 522 on the negative y-axis and vector 524 on the positive x-axis) can also be distributed among the x-axis and the y-axis and the resulting device rotation direction 500 opposite the acceleration vector 520 with components on each axis.

More generally, the accelerations vector 520 is the sum of the vectors 522, 524, 526 and is distributed among the x-axis, y-axis, and z-axis. The vectors 522, 524, 526 may be used to determine the orientation of the vehicle graphic 300 and the type of view of the vehicle graphic 300 in the orientation. For example, vectors 522, 524 may be used to determine the device rotation direction 500.

Figure 9:
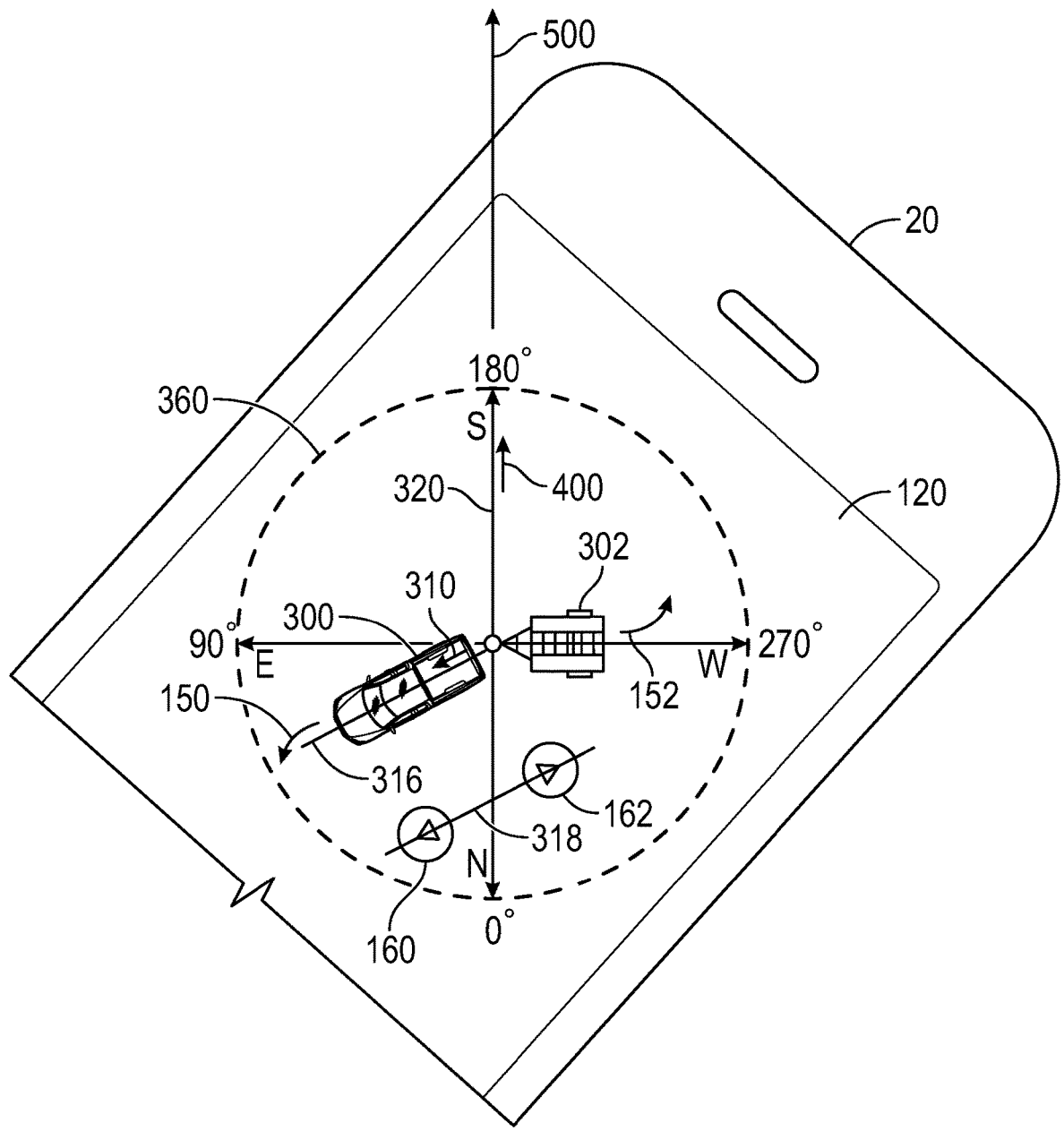
FIG. 9 is a partial schematic illustration of the mobile device of FIG. 5 in accordance with the present disclosure.

Referring to FIG. 9, the coordinate system 320 or image 360 is rotated 380 such that the device location direction 400 is aligned with the device rotation direction 500 of the mobile device 20. For example, if the device location direction 400 is south, the coordinate system 320 is rotated 380 such that south is aligned with the device rotation direction 500. The device location direction 400 is displayed at the top of the coordinate system 320. Accordingly, north is displayed at the bottom of the coordinate system 320, west is at the right of the coordinate system 320, and east is at the left of the coordinate system 320.

Referring to FIG. 7, the vector 526 may be used to determine a type of view of the vehicle graphic 300 and the path graphic 150, 152 based on the tilt of the mobile device 20. For example, if the mobile device 20 is vertical, the view is a perspective view; and if the mobile device 20 is horizontal, the view is a plan view or top view.

For each orientation of the vehicle graphic 300, the mobile device 20 may store each of a top view and an associated perspective view. For example, the perspective views may be captured with a camera of the mobile device 20 and stored with an associated orientation direction 400 as the user 24 walks around the periphery 420 as part of a setup of the mobile device 20. The perspective views may also be computer-generated based on a model and the orientation direction.

Referring to FIGS. 10-13, the rotation of a top or plan view of the vehicle graphic 300 and the trailer graphic 302 are described in further detail. The vehicle graphic 300 and the trailer graphic 302 are displayed on the user interface 120 such that the orientation of the vehicle 2 and the trailer 14 in a user's perspective view from a location 430 along the periphery 420 in a viewing direction 440 corresponds to the orientation of the vehicle graphic 300 and trailer graphic 302 displayed for the user 24 on the user interface 120. The vehicle graphic 300 and the trailer graphic 302 are represented as a top view of the vehicle 2 and trailer 14 (e.g., holding the mobile device 20 in a horizontal orientation) although other views are contemplated as described above.

Figure 10:
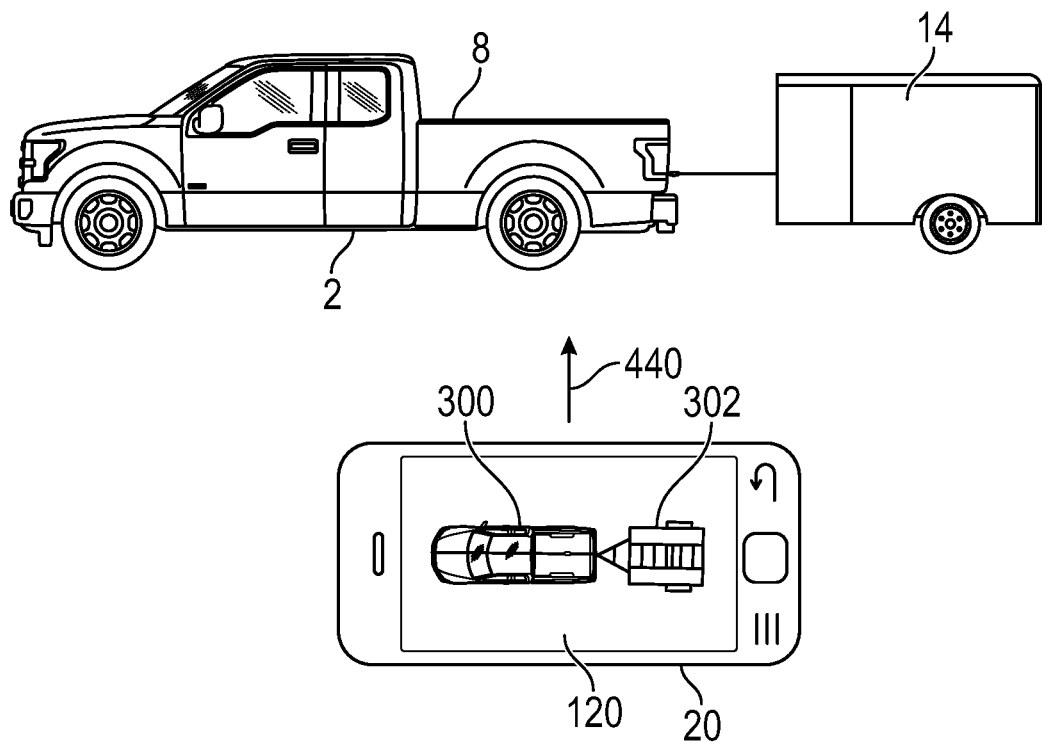
FIG. 10 is a schematic illustration of the use of the mobile device from the driver side of the vehicle and trailer in accordance with the present disclosure.

FIG. 10 illustrates a perspective view of the vehicle 2 and trailer 14 from the driver side 8 and the corresponding orientation of the vehicle graphic 300 and trailer graphic 302 on the mobile device 20.

Figure 11:
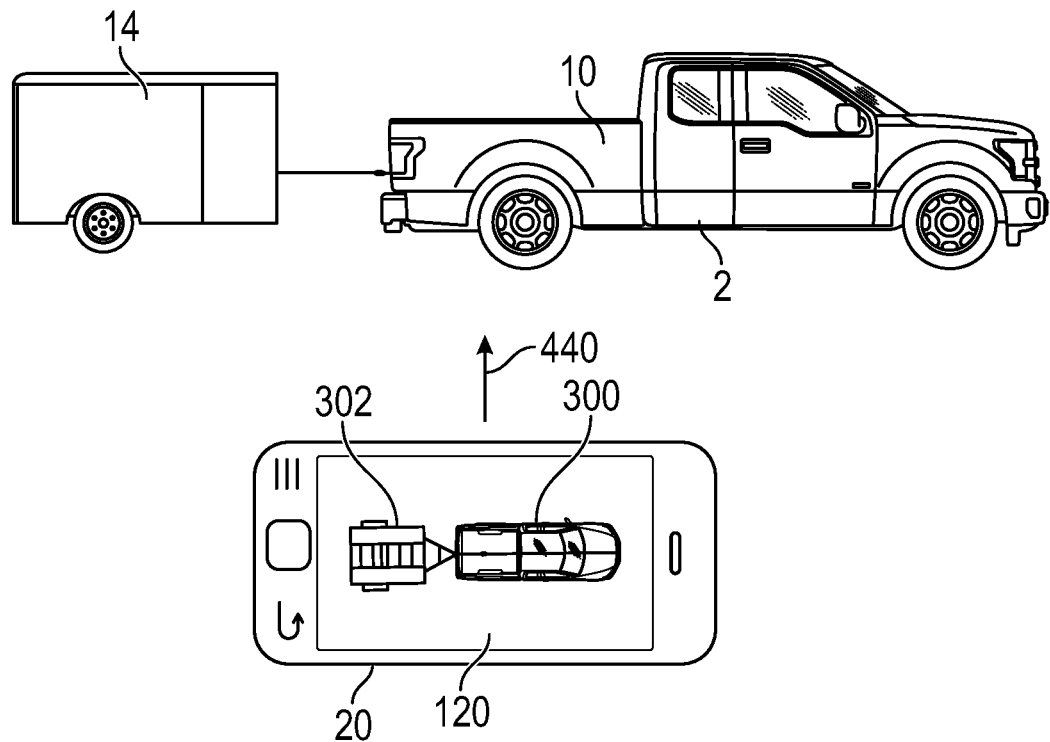
FIG. 11 is a schematic illustration of the use of the mobile device from the passenger side of the vehicle and trailer in accordance with the present disclosure.

FIG. 11 illustrates a perspective view of the vehicle 2 and trailer 14 from the passenger side 10 and the corresponding orientation of the vehicle graphic 300 and trailer graphic 302 on the mobile device 20.

Figure 12:
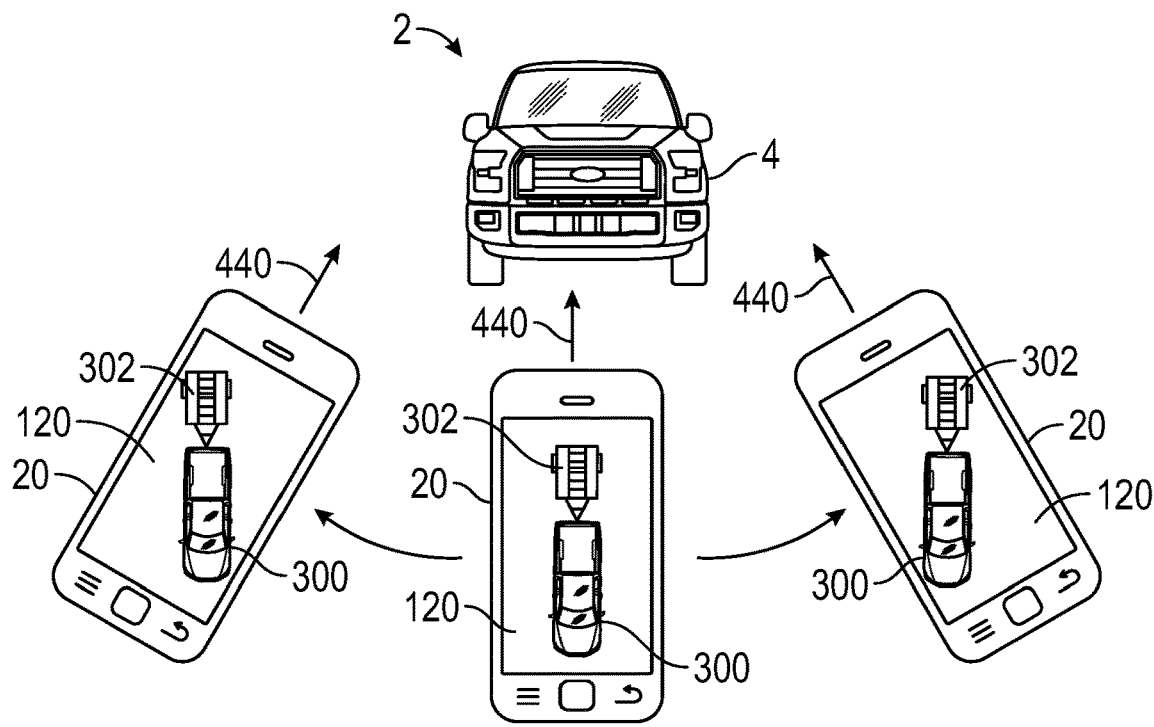
FIG. 12 is a schematic illustration of the use of the mobile device from the front side of the vehicle in accordance with the present disclosure.

FIG. 12 illustrates various perspective views of the vehicle 2 and trailer 14 from the front end 4 (e.g., driver-front end, direct front end, and passenger-front end) and the corresponding orientation of the vehicle graphic 300 and trailer graphic 302 on the mobile device 20.

Figure 13:
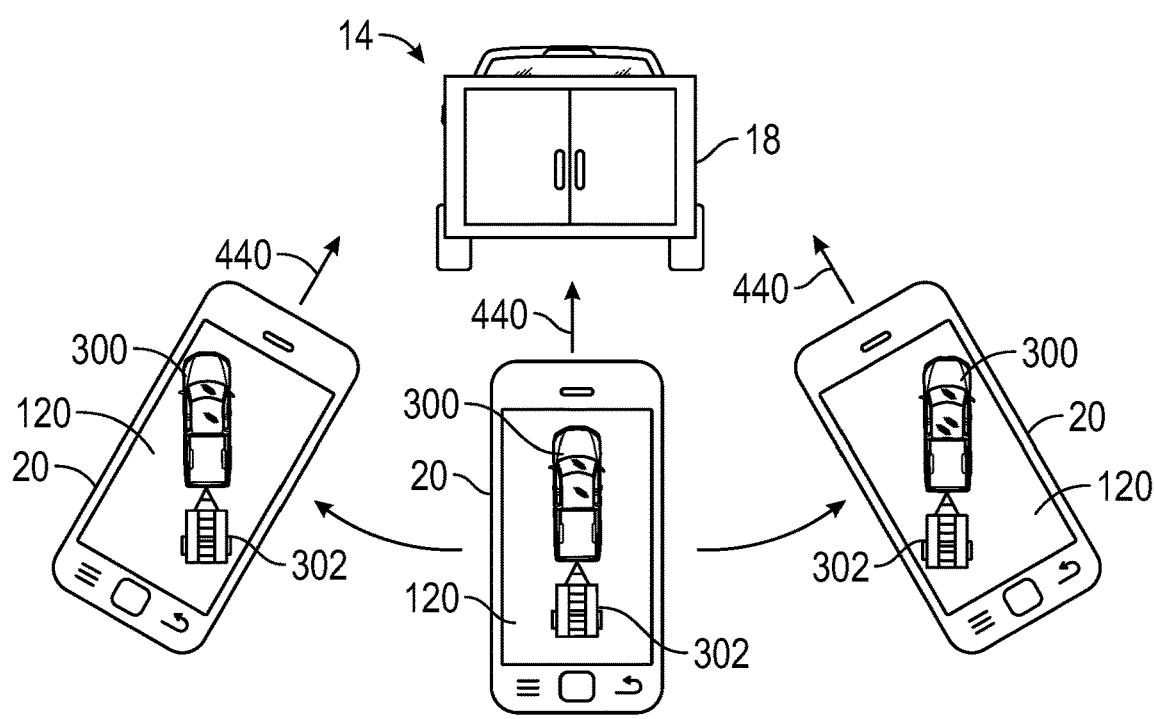
FIG. 13 is a schematic illustration of the use of the mobile device from the back side of the trailer in accordance with the present disclosure.

FIG. 13 illustrates various perspective views of the vehicle 2 and the trailer 14 from the back end 18 (e.g., driver-back end, direct back end, and passenger-back end) and the corresponding orientation of the vehicle graphic 300 and trailer graphic 302 on the mobile device 20.

The orientation of the vehicle graphic 300 and the trailer graphic 302 can be determined for display according to alternative methods.

For example, the mobile device 20 can store a plurality of images of different predetermined orientations of the vehicle graphic 300 and trailer graphic 302 (e.g., those represented in FIGS. 10-13). The mobile device 20 may select an image 1102 from the plurality of images for display on the user interface 120 based on a location 1100 of the mobile device 20.

Figure 14:
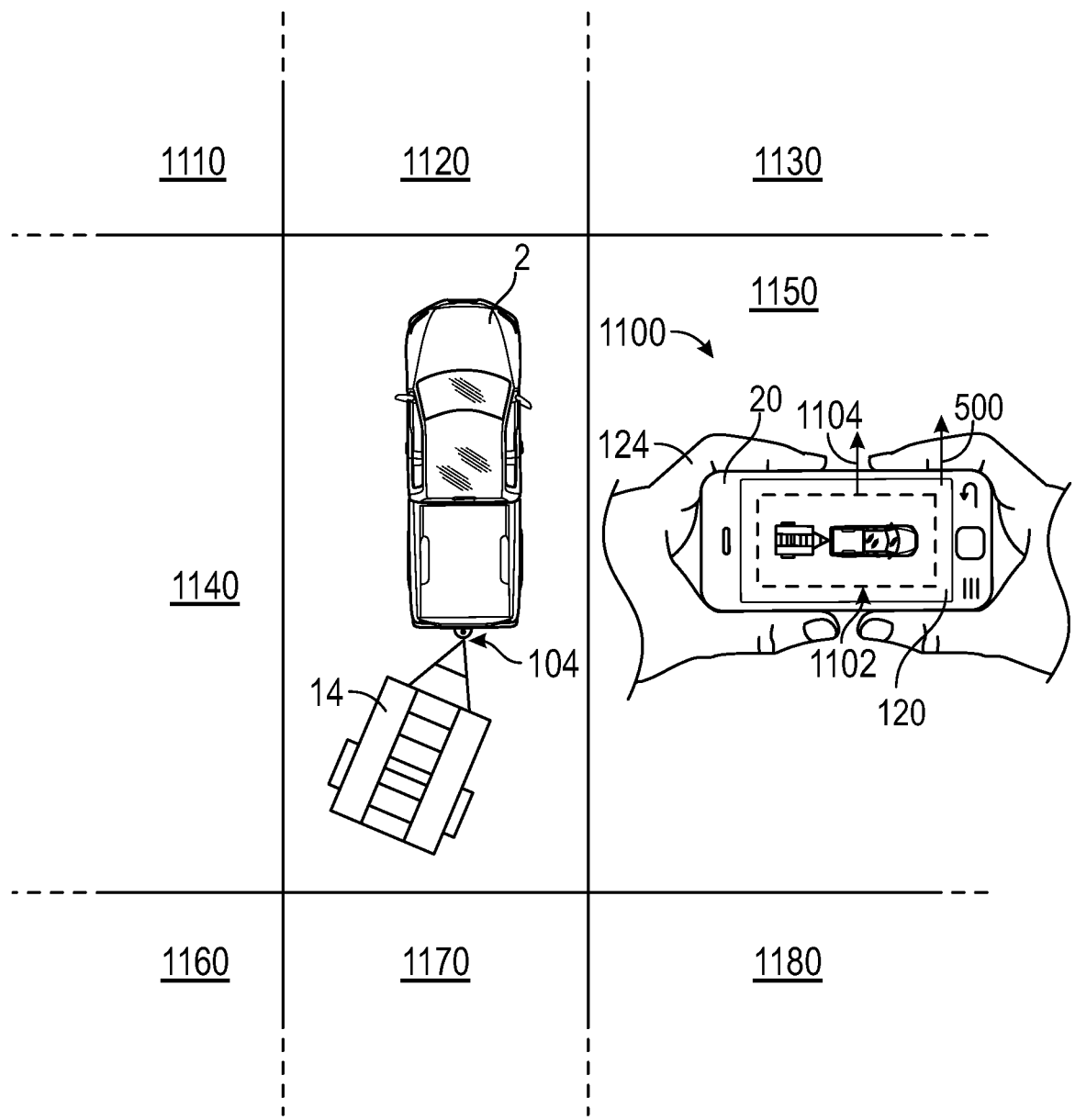
FIG. 14 is a schematic illustration of zones around the vehicle and trailer and the use of the mobile device at a location in one of the zones in accordance with the present disclosure.

Referring to FIG. 14, each image 1102 has a corresponding device location direction 1104. The device location direction 1104 is aligned with the device rotation direction 500 to orient the image 1102 (e.g., as described above with the device location direction 400 and the device rotation direction 500). For example, the images 1102 may be the same but are rotated according to the device location direction 1104 to provide different orientations.

The images 1102 and device location directions 1104 are stored and associated with one of a plurality of zones 1110, 1120, 1130, 1140, 1150, 1160, 1170, 1180 around the periphery of the vehicle 2 and trailer 14. The image 1102 is displayed on the graphical user interface 120 according to the orientation direction 1004. The image 1102 displays the vehicle graphic 300 and trailer graphic 302 according to a view from an associated zone 1110, 1120, 1130, 1140, 1150, 1160, 1170, 1180.

As described above, each of the zones 1110, 1120, 1130, 1140, 1150, 1160, 1170, 1180 may include multiple views (e.g., top view, perspective view, elevation view) that are displayed based on the tilt of the mobile device 20.

The vehicle 2 and/or trailer 14 determines the location 1100 of the mobile device 20 (e.g., with LIDAR sensors or antennas) relative to the vehicle 2 and the trailer 14. As each location 1100 of the mobile device 20 relative to the vehicle 2 and the trailer 14 is associated with one of the plurality of zones 1110, 1120, 1130, 1140, 1150, 1160, 1170, 1180, the vehicle 2 (or the mobile device 20) determines the associated one of the plurality of zones 1110, 1120, 1130, 1140, 1150, 1160, 1170, 1180 based on the determined location 1100.

For example, the illustrated location 1100 is in zone 1150. Once the zone 1150 is determined, the vehicle 2 (or the mobile device 20) determines the associated image 1102 and device location direction 1104. To orient the image 1102 on the user interface 120, the device location direction 1104 is aligned with the device rotation direction 500.

According to another example, feature detection, machine learning, and/or edge detection is used to determine the orientation of the vehicle and trailer from a location of the mobile device 20 (e.g., through identification of perspective lines in an image of a camera of the mobile device 20). The corresponding orientation of the vehicle graphic and trailer graphic can then be determined.

For example, an image recognition application of the mobile device can identify features of the vehicle and trailer in an image captured by a camera of the mobile device from a position around the periphery of the vehicle and trailer. Based on the features of the vehicle and/or trailer, and/or the absence of features of the vehicle and or trailer, the location of the mobile device relative to the trailer can be determined.

According to another example, the user interface can display the images for selection on the user interface and the user can select the image that most closely reflects the position and perspective of the user relative to the vehicle and trailer.

Figure 15:
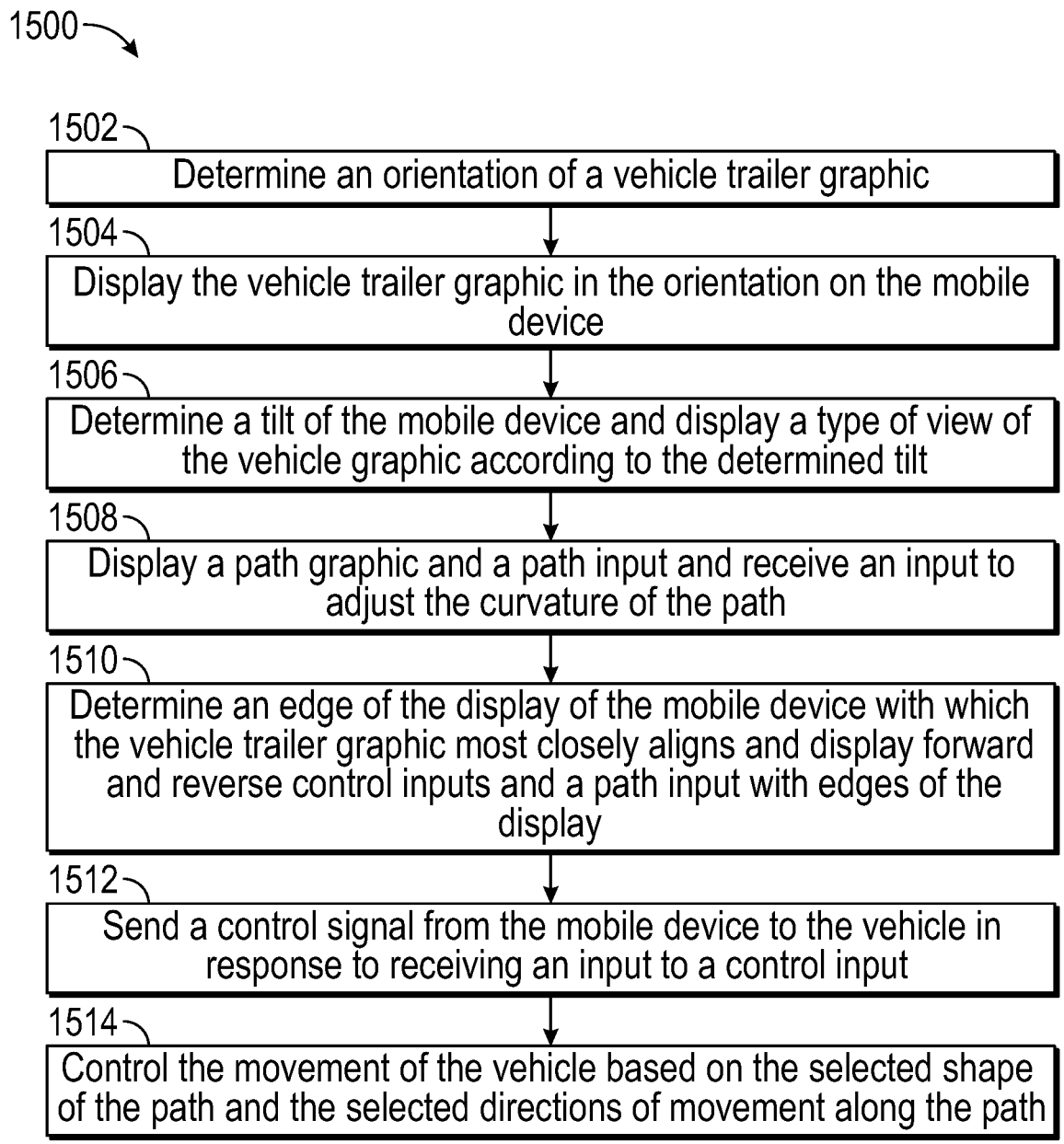
FIG. 15 is a flow chart of an example method of controlling the vehicle with the mobile device of FIG. 1 in accordance with the present disclosure.

Referring to FIG. 15, an example method 1500 of controlling the vehicle 2 and trailer 14 is described. For example, the steps 1502-1512 of the method 1500 may be performed by the processor 28 upon executing instructions of the application 22 that are stored in memory 26.

According to a step 1502, an orientation of a vehicle trailer graphic 300, 302 is determined (e.g., according to methods described in further detail above). The orientation may be based on directions 310, 312 from sensors 130 that represent the vehicle 2 and the trailer 14. The orientation may be based on the device location direction 400 from the compass sensor 410 at a location 430 or the device location direction 1104 associated with a location of the mobile device 20 in a zone. The orientation may further be based on a device rotation direction 500 of the mobile device 20 that accounts for rotation of the mobile device 20. For example, the step can include aligning the device location direction 400 with the device rotation direction 500.

According to a step 1504, the mobile device 20 displays the vehicle trailer graphic 300, 302 in the orientation via the user interface 120.

According to a step 1506, a tilt of the mobile device 20 is determined and the mobile device displays a view of the vehicle trailer graphic 300, 302 according to the determined tilt. For example, if the mobile device 20 is vertical, the view is a perspective view; and if the mobile device 20 is horizontal, the view is a plan view or top view.

According to a step 1508, a path graphic 150, 152 including a shape of a path is displayed via the user interface 120. For example, the mobile device 20 displays the path graphic 150, 152 to extend from the vehicle trailer graphic 300, 302. The path graphic 150, 152 that is displayed may be determined by a selection of a direction of movement (e.g., forward or reverse).

In addition, a path input 180 to change the shape of the path 150, 152 is displayed. For example, the path input 180 may be used to change the curvature of the path 150, 152 or to select from one of a plurality of shapes of paths and the mobile device 20 receives the input and changes the shape of the path graphic 150, 152.

According to a step 1510, the mobile device 20 displays a control input(s) 160, 162 corresponding to directions of movement along the path(s) 150, 152. For example, the mobile device 20 determines an edge 122, 124, 126, 128 (or edges) of the user interface 120 that most closely aligns with the direction 310 of the vehicle graphic 300, 302 and aligns the control input(s) 160, 162 with the edge (e.g., one of parallel edges).

According to a step 1512, the mobile device 20 sends a control signal 170 from the mobile device 20 to the vehicle system controller 110 of the vehicle 2 in response to receiving an input or selection of a direction of movement along the path via the control input 160, 162.

According to a step 1514, the vehicle system controller 110 controls the movement (e.g., autonomously) of the vehicle 2 based on the selected shape of the path from step 206 and the selected direction of movement along the path from step 212. For example, the control signal 170 includes information regarding the selected path, direction movement along the path (e.g., as represented by path graphics 150, 152), and the distance or time to move in the direction along the path, for example, based on a duration of time the control input 160, 162 is engaged.

Referring to FIG. 16, vehicle systems are described in greater detail.

The server(s) 40 may be part of a cloud-based computing infrastructure, and may be associated with and/or include a Telematics Service Delivery Network (SDN) that provides digital data services to the vehicle 2 and other vehicles (not shown in FIG. 16) that may be part of a vehicle fleet.

The vehicle 2 includes a Vehicle Controls Unit (VCU) 50. The VCU 50 includes a plurality of electronic control units (ECUs) 52 disposed in communication with the automotive computer 30.

The VCU 50 may coordinate the data between vehicle systems, connected servers (e.g., the server(s) 40), and other vehicles (not shown in FIG. 16) operating as part of a vehicle fleet. The VCU 50 can include or communicate with any combination of the ECUs 52, such as, for example, a Body Control Module (BCM) 60, an Engine Control Module (ECM) 62, a Transmission Control Module (TCM) 64, a Telematics Control Unit (TCU) 66, a Restraint Control Module (RCM) 68, and the like.

The VCU 50 may control aspects of the vehicle 2, and implement one or more instruction sets received from the application 22 operating on the mobile device 20, and/or from instructions received from a vehicle system controller (such as vehicle system controller 110 described in further detail below).

The TCU 66 can be configured to provide vehicle connectivity to wireless computing systems onboard and off-board the vehicle 2 and is configurable for wireless communication between the vehicle 2 and other systems, computers, and modules. For example, the TCU 66 includes a Navigation (NAV) system 70 for receiving and processing a GPS signal from a GPS 72, a Bluetooth® Low-Energy Module (BLEM) 74, a Wi-Fi transceiver, an Ultra-Wide Band (UWB) transceiver, and/or other wireless transceivers (not shown in FIG. 16).

The NAV system 70 may be configured and/or programmed to determine a position of the vehicle 2 and the trailer 14. The NAV system 70 may include a Global Positioning System (GPS) receiver configured or programmed to triangulate the position of the vehicle 2 relative to satellites or terrestrial based transmitter towers associated with the GPS 72. The NAV system 70, therefore, may be configured or programmed for wireless communication.

The NAV system 70 may be further configured or programmed to develop routes from a current location to a selected destination, as well as display a map and present driving directions to the selected destination via, e.g., the user interface 120. In some instances, the NAV system 70 may develop the route according to a user preference. Examples of user preferences may include maximizing fuel efficiency, reducing travel time, travelling the shortest distance, or the like.

The TCU 66 generally includes wireless transmission and communication hardware that may be disposed in communication with one or more transceivers associated with telecommunications towers and other wireless telecommunications infrastructure. For example, the BLEM 74 may be configured and/or programmed to receive messages from, and transmit messages to, one or more cellular towers associated with a telecommunication provider, and/or and a Telematics Service Delivery Network (SDN) associated with the vehicle 2 for coordinating vehicle fleet (not shown in FIG. 16).

The TCU 66 may be disposed in communication with the ECUs 52 by way of a Controller Area Network (CAN) bus 80. In some aspects, the TCU 66 may retrieve data and send data as a CAN bus 80 node.

The BLEM 74 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 74 may include Generic Attribute Profile (GATT) device connectivity for client devices that respond to or initiate GATT commands and requests, and connect directly with the mobile device 20.

The CAN bus 80 may be configured as a multi-master serial bus standard for connecting two or more of the ECUs 52 as nodes using a message-based protocol that can be configured and/or programmed to allow the ECUs 52 to communicate with each other. The CAN bus 80 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 52 may communicate with a host computer (e.g., the automotive computer 30, the system 100, and/or the server(s) 40, etc.), and may also communicate with one another without the necessity of a host computer.

The CAN bus 80 may connect the ECUs 52 with the automotive computer 30 such that the automotive computer 30 may retrieve information from, send information to, and otherwise interact with the ECUs 52 to perform steps described according to embodiments of the present disclosure. The CAN bus 80 may connect CAN bus nodes (e.g., the ECUs 52) to each other through a two-wire bus, which may be a twisted pair having a nominal characteristic impedance. The CAN bus 80 may also be accomplished using other communication protocol solutions, such as Media Oriented Systems Transport (MOST) or Ethernet. In other aspects, the CAN bus 80 may be a wireless intra-vehicle CAN bus.

The VCU 50 may control various loads directly via the CAN bus 80 communication or implement such control in conjunction with the BCM 60. The ECUs 52 described with respect to the VCU 50 are provided for exemplary purposes only, and are not intended to be limiting or exclusive. Control and/or communication with other control modules not shown in FIG. 16 is possible, and such control is contemplated.

The ECUs 52 may control aspects of vehicle operation and communication using inputs from human drivers, inputs from a vehicle system controller 110, the vehicle control system 100, and/or via wireless signal inputs received via wireless channel(s) 94 from other connected devices such as the mobile device 20, among others. The ECUs 52, when configured as nodes in the CAN bus 80, may each include a central processing unit (CPU), a CAN controller, and/or a transceiver (not shown in FIG. 16). For example, although the mobile device 20 is depicted in FIG. 16 as connecting to the vehicle 2 via the BLEM 74, it is contemplated that the wireless connection may also or alternatively be established between the mobile device 20 and one or more of the ECUs 52 via the respective transceiver(s) associated with the module(s).

The BCM 60 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 60 may also operate as a gateway for bus and network interfaces to interact with remote ECUs (not shown in FIG. 16).

The BCM 60 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 60 may be configured for vehicle energy management, exterior lighting control, wiper functionality, power window and door functionality, heating ventilation and air conditioning systems, and driver integration systems. In other aspects, the BCM 60 may control auxiliary equipment functionality, and/or is responsible for integration of such functionality. In one aspect, a vehicle having a vehicle control system 100 may integrate the system using, at least in part, the BCM 60.

The mobile device 20 may connect with the automotive computer 30 using wired and/or wireless communication protocols and transceivers. The mobile device 20 may be communicatively coupled with the vehicle 2 via one or more network(s) 92, which may communicate via one or more wireless channel(s) 94, and/or may connect with the vehicle 2 directly using near field communication (NFC) protocols, Bluetooth® protocols, Wi-Fi, Ultra-Wide Band (UWB), and other possible data connection and sharing techniques. The vehicle 2 may also receive and/or be in communication with the Global Positioning System (GPS) 72.

In some aspects, the mobile device 20 may communicate with the vehicle 2 through the one or more wireless channel(s) 90, which may be encrypted and established between the mobile device 20 and the Telematics Control Unit (TCU) 66. The mobile device 20 may communicate with the TCU 66 using a wireless transmitter associated with the TCU 66 on the vehicle 2. The transmitter may communicate with the mobile device 20 using a wireless communication network such as, for example, the one or more network(s) 92. The wireless channel(s) 90 are depicted in FIG. 16 as communicating via the one or more network(s) 92, and also via direct communication (e.g., channel 94) with the vehicle 2.

The network(s) 92 illustrate an example of an example communication infrastructure in which the connected devices discussed in various embodiments of this disclosure may communicate. The network(s) 92 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method for controlling a vehicle, comprising:
   determining a first orientation of a vehicle graphic for display on a user interface of a mobile device, the vehicle graphic representing a vehicle and a trailer, wherein the first orientation comprises a first device location direction relative to the vehicle and a first device rotation direction;
   determining a tilt of the mobile device;
   presenting, via the user interface of the mobile device, a first view of the vehicle graphic according to the first orientation and tilt;
   determining a second orientation of the vehicle graphic, the second orientation comprising the first device location direction relative to the vehicle and a second device rotation direction; and
   presenting, via the user interface of the mobile device, a second view of the vehicle graphic according to the second orientation.

2. The method of claim 1, wherein the first orientation is based on a measurement of a direction of a vehicle.

3. The method of claim 2, wherein the first orientation is based on a measurement of a device location direction.

4. The method of claim 1, comprising aligning the first device location direction and the first device rotation direction.

5. The method of claim 1, wherein the first orientation is based on determining a zone based on a location of the mobile device.

6. The method of claim 1, wherein a perspective view of the vehicle graphic is presented based on the tilt.

7. The method of claim 1, comprising presenting, via the user interface, a path graphic representing a path extending from the vehicle graphic in one of a forward direction and a reverse direction.

8. The method of claim 7, comprising presenting a path input configured to change a shape of the path graphic, the path input comprising a slide input comprising a setting element that is configured to be adjusted between a first edge of the path input and a second edge of the path input.

9. The method of claim 8, comprising changing a shape of the path based on receiving input via the path input.

10. The method of claim 9, wherein changing a shape of the path includes changing a curvature via the path input.

11. The method of claim 8, comprising determining an edge of the user interface that most closely aligns with an axis that is perpendicular to the path graphic and aligning the path input with the edge.

12. The method of claim 7, comprising presenting, via the user interface, at least one control input corresponding to a direction of movement along the path and a path input configured to change a shape of the path graphic.

13. The method of claim 12, comprising determining an edge that most closely aligns with the path graphic and aligning the at least one control input along the edge, wherein the control input is perpendicular to the path input.

14. The method of claim 13, wherein determining an edge comprises determining an edge that most closely aligns with a direction of the path graphic.

15. The method of claim 12, comprising sending a control signal from the mobile device to a vehicle system controller of the vehicle in response to receiving a selection of a direction of movement along the path via the control input.

16. The method of claim 15, comprising controlling movement of the vehicle with the vehicle system controller based on a shape of the path of the path graphic.

17. A system, comprising:
a vehicle control system configured to control a movement of a vehicle based on a shape of a path and corresponding control input; and
a mobile device, comprising:
a user interface;
a processor; and
a memory comprising instructions that, when executed by the processor, cause the processor to perform operations comprising:
determine a first orientation of a vehicle graphic for display on the user interface, the vehicle graphic representing a vehicle and a trailer, wherein the first orientation comprises a first device location direction relative to the vehicle and a first device rotation direction;
determine a tilt of the mobile device;
display, via the user interface of the mobile device, a first view of the vehicle graphic according to the first orientation and tilt;
determine a second orientation of the vehicle graphic, the second orientation comprising the first device location direction relative to the vehicle and a second device rotation direction; and
display, via the user interface of the mobile device, a second view of the vehicle graphic according to the second orientation.

18. The system of claim 17, comprising an accelerometer, wherein the tilt is determined based on a measurement of the accelerometer.

* * * * *